(12) United States Patent
Češko et al.

(10) Patent No.: US 11,661,989 B2
(45) Date of Patent: May 30, 2023

(54) HOLLOW TUBULAR CENTER BULGING FOAM SPRING

(71) Applicant: ELISANA S.A.R.L., Luxembourg (LU)

(72) Inventors: Sandi Češko, Izlake (SI); Heiko Peter Werner, Izlake (SI)

(73) Assignee: ELISANA S.A.R.L., Luxembourg (LU)

( * ) Notice: Subject to any disclaimer, the term of this patent is extended or adjusted under 35 U.S.C. 154(b) by 0 days.

(21) Appl. No.: 16/766,615

(22) PCT Filed: Nov. 20, 2018

(86) PCT No.: PCT/IB2018/059150
§ 371 (c)(1),
(2) Date: May 22, 2020

(87) PCT Pub. No.: WO2019/102358
PCT Pub. Date: May 31, 2019

(65) Prior Publication Data
US 2021/0003186 A1    Jan. 7, 2021

Related U.S. Application Data

(60) Provisional application No. 62/590,084, filed on Nov. 22, 2017.

(51) Int. Cl.
*F16F 1/37* (2006.01)
*A47C 7/18* (2006.01)
(Continued)

(52) U.S. Cl.
CPC ............... *F16F 1/37* (2013.01); *A47C 7/18* (2013.01); *A47C 20/02* (2013.01);
(Continued)

(58) Field of Classification Search
CPC ...... F16F 1/37; F16F 1/377; F16F 2224/0225; A47C 7/18; A47C 20/02; A47C 27/0453;
(Continued)

(56) References Cited

U.S. PATENT DOCUMENTS 2,539,058 A * 1/1951 Burns ................... A47C 27/22
5/652
4,194,255 A * 3/1980 Poppe .................. A47C 27/065
267/153
(Continued)

FOREIGN PATENT DOCUMENTS

CN        1842286 A   10/2006
CN      101784216 A    7/2010
(Continued)

OTHER PUBLICATIONS

International Search Report and Written Opinion received in PCT/IB2018/059150 dated Jan. 25, 2019; pp. 9.

*Primary Examiner* — David R Hare
(74) *Attorney, Agent, or Firm* — Hard IP LLC

(57) ABSTRACT

A hollow tubular foam spring having a plurality of radially extending holes extending from an outer surface towards a central hollow core. The tubular foam spring is arranged with wall thickness and diameter to height ratios such that center bulging is achieved under compressive loads. In an embodiment, such as in a mattress, seat, cushion or pillow, springs are arranged in an array whereby some impinge upon one another due to central bulging.

12 Claims, 7 Drawing Sheets

(51) Int. Cl.
 *A47C 20/02*  (2006.01)
 *A47C 27/045*  (2006.01)
 *A47C 27/06*  (2006.01)
 *A47G 9/10*  (2006.01)
 *A47C 27/05*  (2006.01)

(52) U.S. Cl.
 CPC ........ *A47C 27/0453* (2013.01); *A47C 27/065* (2013.01); *A47G 9/10* (2013.01); *A47C 27/056* (2013.01); *A47G 2009/1018* (2013.01); *A47G 2400/10* (2013.01); *F16F 2224/0225* (2013.01); *F16F 2234/02* (2013.01)

(58) Field of Classification Search
 CPC . A47C 27/065; A47C 27/056; A47C 23/0438; A47G 9/10; A47G 2009/1018; A47G 2400/10; A16F 2234/02
 See application file for complete search history.

(56) References Cited

U.S. PATENT DOCUMENTS

| | | | | |
|---|---|---|---|---|
| 6,061,856 | A * | 5/2000 | Hoffmann | A47C 27/148 5/706 |
| 7,222,379 | B2 * | 5/2007 | DiGirolamo | A47G 9/10 5/636 |
| 7,428,764 | B2 * | 9/2008 | Clark | A47C 27/20 5/655.9 |
| 9,221,374 | B2 * | 12/2015 | Kolich | B60N 2/5664 |
| 10,932,587 | B2 * | 3/2021 | Poppe | A47C 27/142 |
| 2005/0172468 | A1 * | 8/2005 | Poppe | A47C 27/20 29/91.1 |
| 2006/0248652 | A1 * | 11/2006 | Alonso Cucurull | A47C 27/15 5/740 |
| 2006/0282954 | A1 * | 12/2006 | Poppe | F16F 1/028 5/720 |
| 2009/0071302 | A1 * | 3/2009 | Poppe | A47C 27/20 83/23 |
| 2009/0079119 | A1 * | 3/2009 | Poppe | F16F 1/37 267/142 |
| 2009/0100603 | A1 * | 4/2009 | Poppe | A47C 27/20 5/655.9 |
| 2010/0218318 | A1 | 9/2010 | Steppat et al. | |
| 2010/0270718 | A1 | 10/2010 | Poppe | |

FOREIGN PATENT DOCUMENTS

| | | | |
|---|---|---|---|
| CN | 102413737 A | 4/2012 | |
| DE | 10306039 A1 | 9/2004 | |
| EP | 872198 A2 * | 10/1998 | ........... A47C 27/065 |
| EP | 0872198 A2 | 10/1998 | |
| JP | 2012110436 A | 6/2012 | |

* cited by examiner

HOLLOW TUBULAR CENTER BULGING FOAM SPRING

CROSS-REFERENCE TO RELATED APPLICATIONS

This application is a U.S. national stage filing under 35 U.S.C. 371 of international patent application no. PCT/IB 2018/059150, filed Nov. 20, 2018, which has priority to U.S. Patent Application No. 62/590,084, filed Nov. 22, 2017 and titled, "Hollow Tubular Center Bulging Foam Spring", both of which are referred to and incorporated herein in their entirety.

FIELD OF THE INVENTION

The invention relates to generally cylindrical foam based springs such as used in cushions, pillows, mattresses, and seats.

BACKGROUND OF THE INVENTION

A variety of hollow core foam based springs such as for use in cushions, pillows, seats, mattresses, and the like are known. Foam springs having a generally tubular shape with plural slits or holes extending inwards from an outer surface also are known.

One example of such hollow core cylindrical foam based springs is found in Pope U.S. Pat. No. 4,194,255 and Poppe U.S. Published Application No. US 2009/0079119A1. In that example, generally laterally uniform holes extending inward are illustrated in which the holes form a laterally extending diamond shape. One disadvantage of such a construction is bulging that occurs when vertical (i.e. axial) compression is applied typically causes lateral (sideways) dislocation or collapse. A disadvantage of such lateral or sideways bulging is that the springs either need to be spaced apart when positioned in a spring bed (such as in a cushion, pillow, mattress, seat or the like), or if more closely packed, may impinge upon one another under compressive loads. Another disadvantage of this spring construction is a tendency at rest for the top and bottom edges to bulge out radially, and relative difficulty in manufacture in gluing opposite ends of a cut foam strip to form the cylindrical spring.

Another example of hollow core cylindrical foam bases spring is found in Poppe U.S. Pat. No. 8,353,501 B2. In that example, a pattern of half diamond, and full laterally extended diamond shaped holes is illustrated, with the holes separated by a spacer column. Such foam based springs are understood to exhibit a greater compression resistance (i.e. higher spring constant) as compared to those illustrated in the examples discussed above. However, they also are understood to require additional foam material as used in the spacer columns. A further disadvantage of these foam springs is lateral (sideways) dislocation or collapse upon application a axial loads. Another disadvantage is a relatively low height to diameter ratio, also limiting the packing density in a spring bed.

Accordingly, there is a need for a hollow core generally cylindrical foam based spring having an elongated hole pattern promoting center bulging upon axial loads, ease of fabrication in maintaining glued seam integrity, while reducing sideways collapse upon application of axial loads.

SUMMARY OF THE INVENTION

The present invention relates to foam springs such as used in cushions, pillows, mattresses, seats and the like having holes extending from an exterior surface towards an inner hollow core of the spring. The spring has achieves a desired diameter to height ratio while promoting center bulging, which in some embodiments utilizes reduced interior wall thicknesses compared to know springs, producing a surprising result of increased compressive load resistance (i.e. higher spring constant) due to concentration of bulging displacements in the middle of the spring. An advantage off such a bulge profile is that the springs tend to maintain an axially sound (i.e. upright for vertically oriented springs) positioning, with the bulging of individual springs directed towards adjacent springs. In some embodiments, when packed in an array, the bulges of interior springs impinge upon those of adjacent springs imparting slip resistance and improved axial compression resistance. Likewise, springs can achieve having a relatively high height to diameter ratio while maintaining structural soundness.

In a further embodiment of the present invention a center bulging foam material spring is provided. Upon the application of a compressive force (i.e. axial direction), a spring in accordance with the present invention bulges radially outwards in its center portion (i.e. in the region about the middle of its vertical or axial direction). When packed in an array with other springs in accordance with the present invention, adjacent springs bulge outwards and optionally impinge upon one another, providing enhanced resistance to axial compression. In an embodiment in which the springs are positioned in an array in a mattress, for example, the springs provide enhanced support. A further advantage of the present invention is that the increased compression resistance allows for thinner walls and reduced material use to produce the spring, while still providing a similar compression resistance as bulkier springs.

These and other embodiments of the invention are described in the description and figures that follow. This summary and the following detailed description are merely exemplary, illustrative, and explanatory, and are not intended to limit, but to provide further explanation of the invention as claimed. Other systems, methods, features, and advantages of the example embodiments will be or will become apparent to one skilled in the art upon examination of the following figures and detailed description.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely. Illustrated in the accompanying drawing(s) is at least one of the best mode embodiments of the present invention.

DETAILED DESCRIPTION

Figure 1:
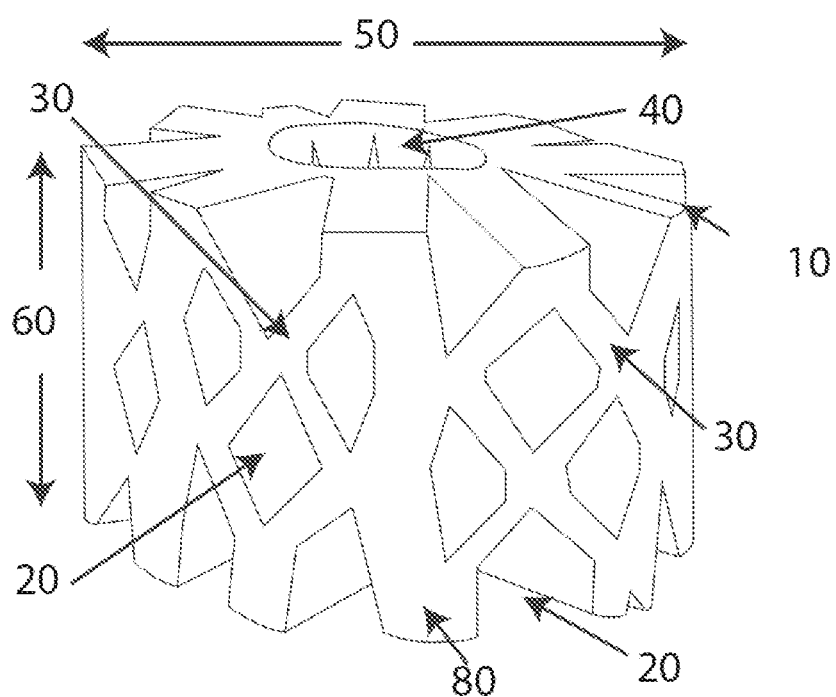
FIG. 1 is a perspective view of a hollow tubular foam spring in accordance with the invention.

Before the present subject matter is described in detail, it is to be understood that this disclosure is not limited to the particular embodiments described, as such may vary. It should also be understood that the terminology used herein is to describing particular embodiments only, and is not intended to be limiting, since the scope of the present disclosure will be limited only by the appended claims. While this invention is susceptible to different embodiments in different forms, there is shown in the drawings and will here be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, it should be understood that what is illustrated is set forth only for the purposes of example and should not be taken as a limitation on the scope of the present invention.

In the following description and in the figures, like elements are identified with like reference numerals. The use of "e.g.," "etc.,", "or" and "the like" indicates non-exclusive alternatives without limitation, unless otherwise noted. The use of "having", "comprising", "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Figure 2:
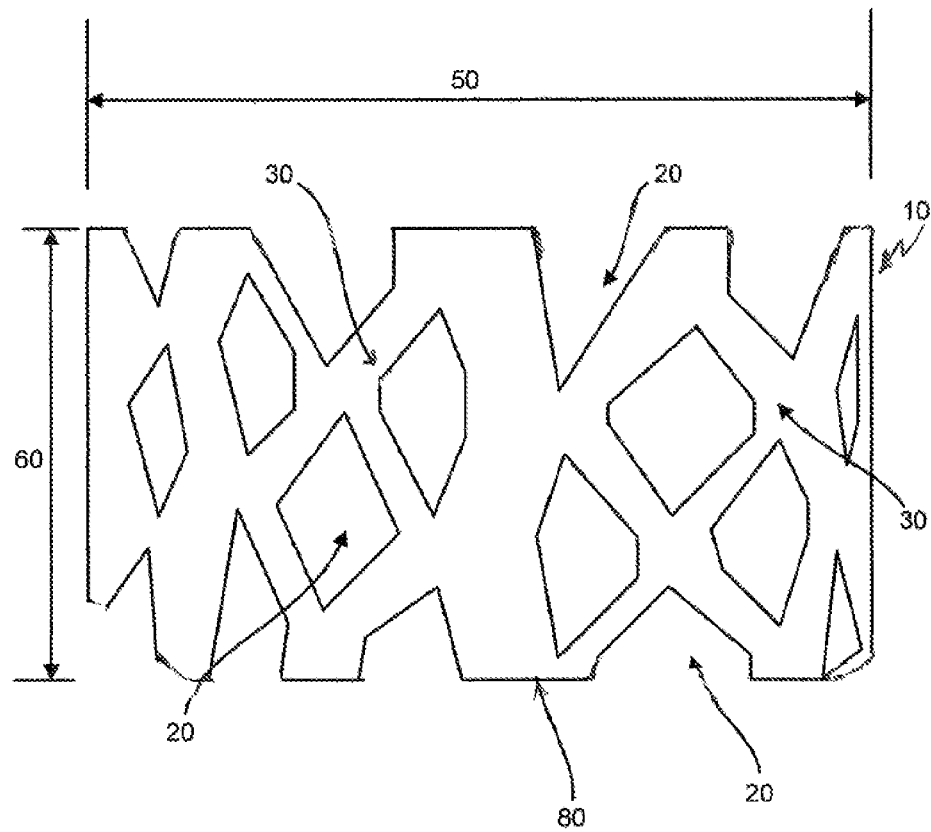
FIG. 2 is a side view of a hollow tubular foam spring in accordance with the invention.

Turning to the figures, FIGS. 1 and 2 illustrate an example of a foam spring 10 of the present invention. The foam spring 10 has a generally hollow tubular shaped body with a plurality of holes 20 formed within. The holes extend from an exterior surface 30 of the spring 10 radially inwards towards the center of the spring 10. A hollow central core 40 is provided, although it is understood that in some embodiments a core 40 may not be provided. The holes 30 may be formed by any technique. Examples of suitable techniques are material removal from a solid cylinder, and forming axial cuts in a foam strip and then bending the strip to connect its respective ends forming the hollow cylinder shape. The diameter of the spring 10 in a relaxed state is illustrated with reference number 50 and the height of the spring 10 in the relaxed state is illustrated with reference number 60. It has been found that the punctured cylindrical foam springs 10 have maintained the desired center bulging property at diameter to height ratios well under 4:3 (diameter:height), and not achieved with prior springs tested. However, it should be understood that any height to width ratio of the spring may be selected in which, upon the application of compressive force, the spring bulges in its vertical center region and avoids lateral slippage.

To fabricate the spring, a foam strip is provided and through slits are cut in it. Opposite ends of the foam strip are attached causing the cut slits to open on the outside, forming holes 20, extending from the exterior surface of the spring 10 inwards towards the core 40. The slit length is selected such that desired center bulging of the spring 10 upon compression is achieved.

Figure 3:
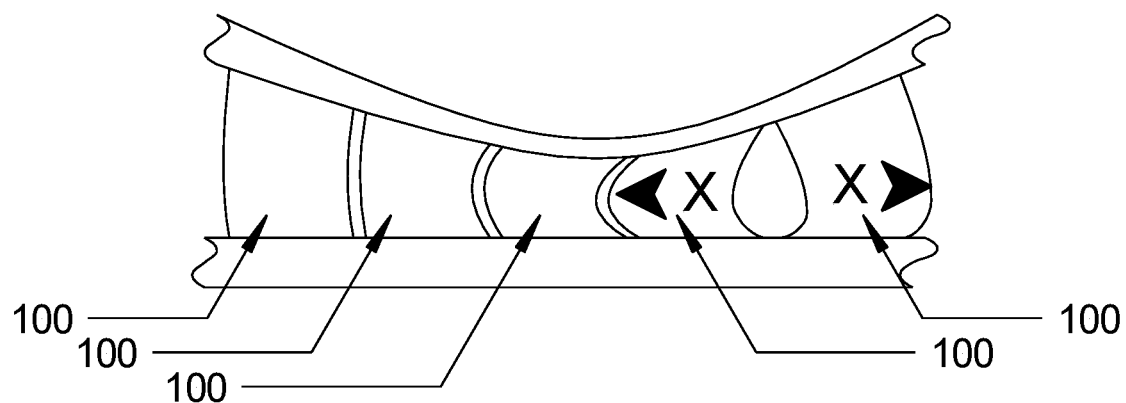
FIG. 3 is a side view of an array of prior art springs being compressed and exhibiting sideways slippage.
Figure 4:
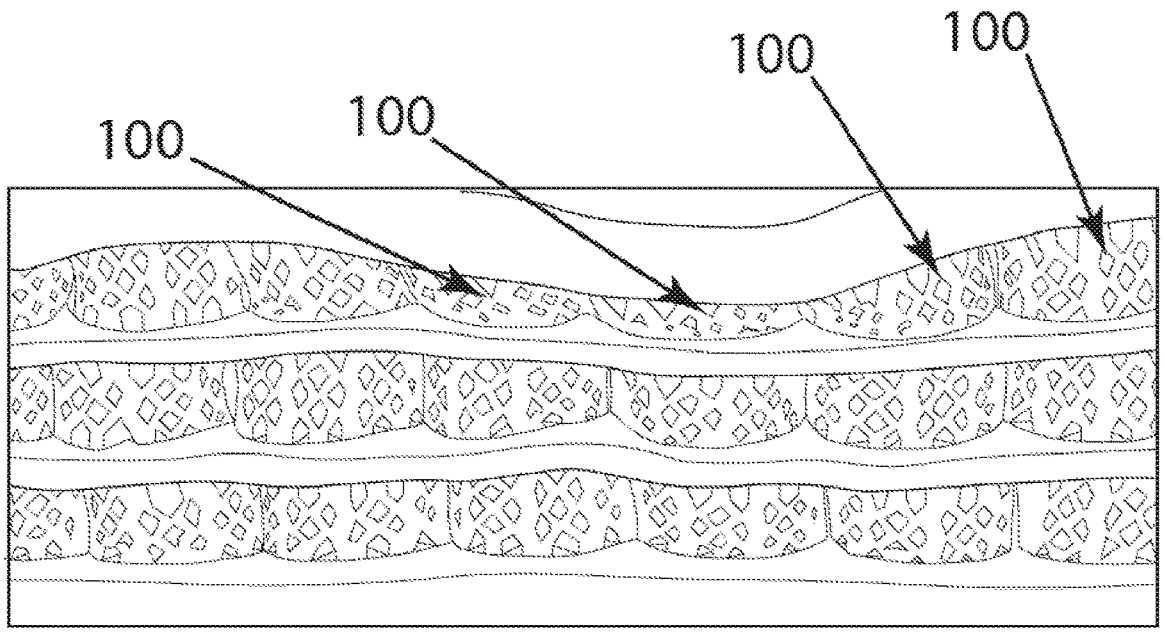
FIG. 4 is a side view of a test apparatus with an array of prior art springs being compressed and exhibiting sideways slippage.

Various springs of the present invention and prior known springs were tested to determine whether the desired center bulging (as opposed to slippage) are achieved. In one example using the prior spring as illustrated in FIGS. 3 and 4, it was found that the bulb effect due to inner spring forces was relatively small, so the spring tended to slip laterally, or collapse to one side if the diameter to height ratio was greater than 4:3. As illustrated in FIG. 3, the tested prior art springs 100 are illustrated to bow out in a first radial direction X, without a similar bow outwards on the opposing surface. In FIG. 4, an experimental arrangement is shown in which springs 100 were compressed and the slippage illustrated in FIG. 3 was observed.

Figure 5:
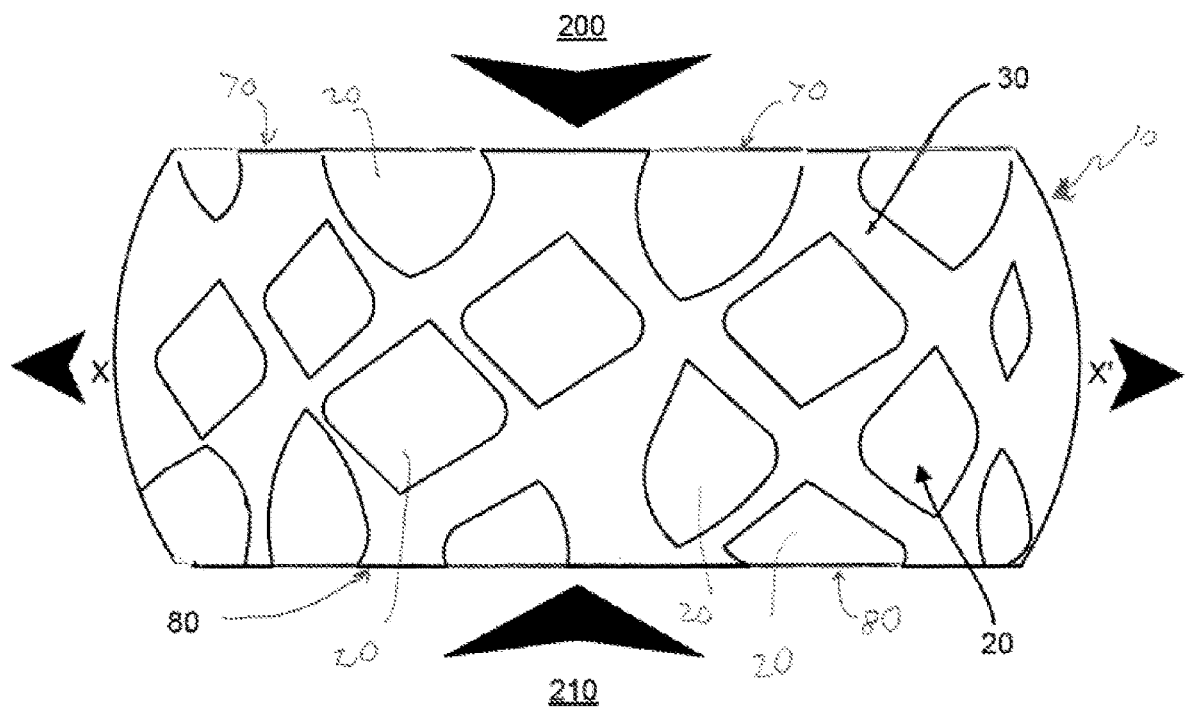
FIG. 5 is a side view of a hollow tubular spring in accordance with the invention under an axial (vertical) load and exhibiting center bulging in accordance with the invention.
Figure 6:
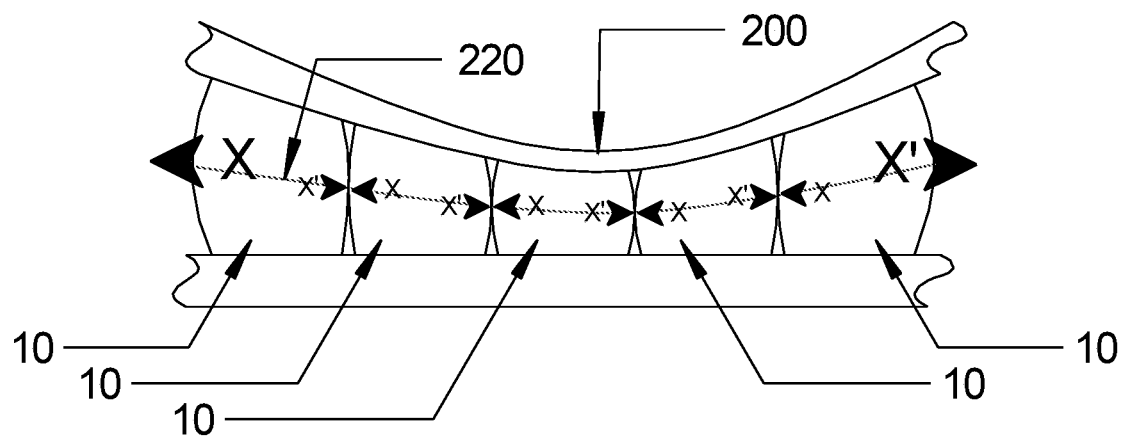
FIG. 6 is a side view of an array of hollow tubular springs in accordance with the invention being compressed and exhibiting center bulging in accordance with the invention.
Figure 7:
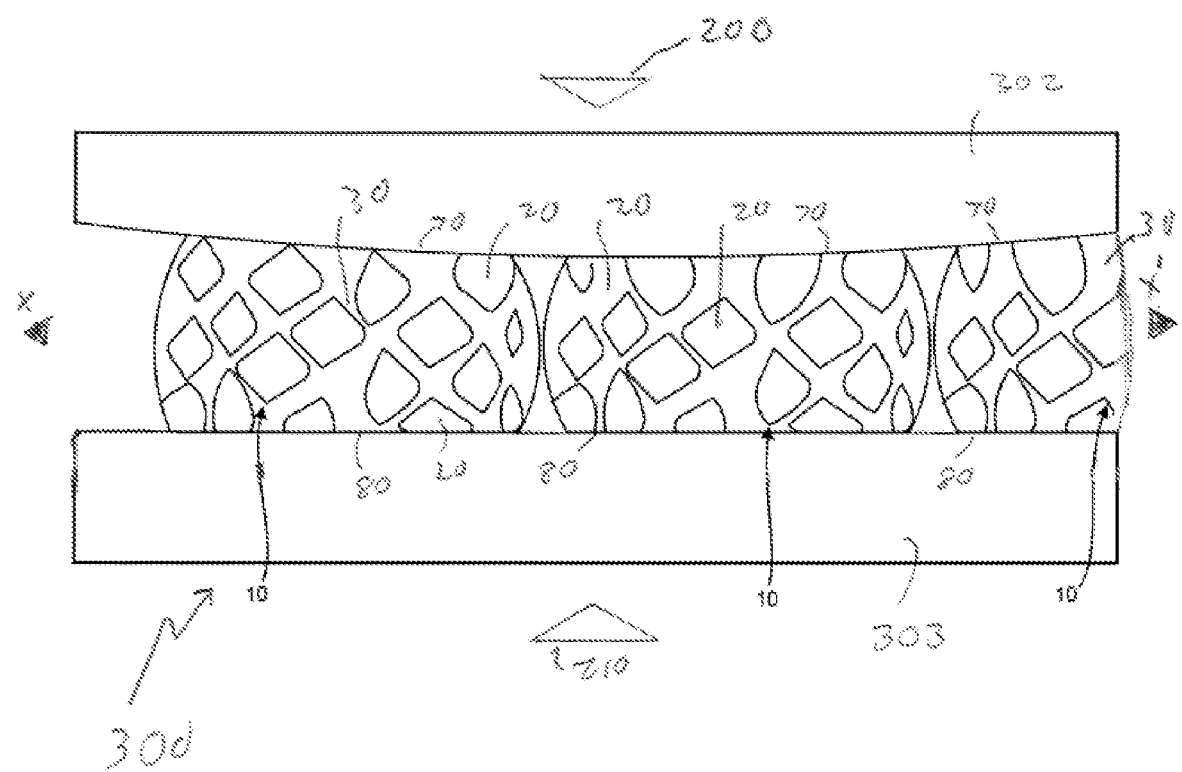
FIG. 7 is a side view of a test apparatus with an array of hollow tubular springs in accordance with the invention being compressed and exhibiting center bulging in accordance with the invention.

An example of the present invention showing the middle bulge desired is illustrated in FIGS. 5-7. In FIG. 5, a spring 10 in accordance with the present invention, is shown under axial compression. A compressive force 200 is applied downward to the top 70 of the spring. The opposing force on the bottom 80 of the spring 10 of the ground in direction 210 is also illustrated. In this example the spring bulges to the side in both directions, as illustrated with reference indicators X and X'. In the illustration direction X is shown to the left, and X' to the right, but it should be understood that the bulge may be fully around the spring in or about its center. An array of springs 10 is illustrated in FIGS. 6 and 7, such as positioned within a cushion, seat, pillow or mattress 300 optionally having a sheet layers 302, 303 adjacent the respective top sides 70 and bottom sides 80 of the foam springs 10, respectively, in which compressive forces are applied in the axial direction (illustrated with reference numbers 200 and 210 and corresponding arrows) on the springs 10 positioned within the mattress 300, such as by example applying a first force 200 (such as in an axial direction) via optional foam layer 302 and an opposing second force 210 via optional layer 303. It is seen that for each spring bulging at or near the center line 220 is achieved, in the X directions illustrated with X and X' and corresponding arrows. For adjacent springs the opposing forces in the bulging in the X directions are shown to impinge upon the bulging in the X' directions, with adjacent springs providing structural support to one another.

Figure 8:
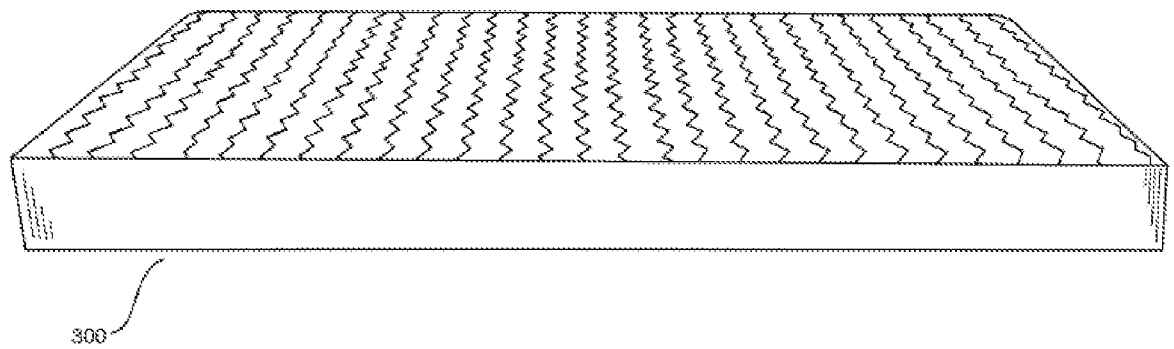
FIG. 8 is a perspective view of a mattress in accordance with the invention.
Figure 9:
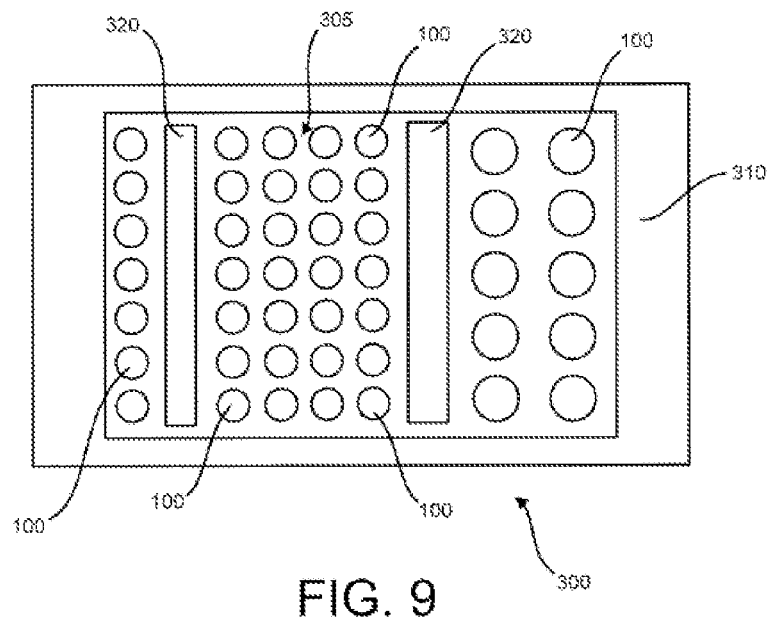
FIG. 9 is a top cross-sectional view of a mattress in accordance with the invention.

An example of a mattress 300 in accordance with the invention is illustrated in FIG. 8. In the mattress 300, foam springs 100 in accordance with the invention may be positioned in an array, such as illustrated in FIGS. 4 and 6 in the interior of the mattress. A top cross-sectional view of such an array is illustrated in FIG. 9. As illustrated in FIG. 9, a foam springs 100 are positioned in an interior space 305 of the mattress 300, in any desired arrangement. Likewise plural layers of springs 100 can be provided in the interior space 305. Optionally an edge structure 310 or optional interior spacers 320 are provided, providing further alignment for the springs 100. Any number or arrangement of additional supports or spacers 310, 320 may be provided such that the mattress 300 may achieve desired structural characteristics.

Figure 10:
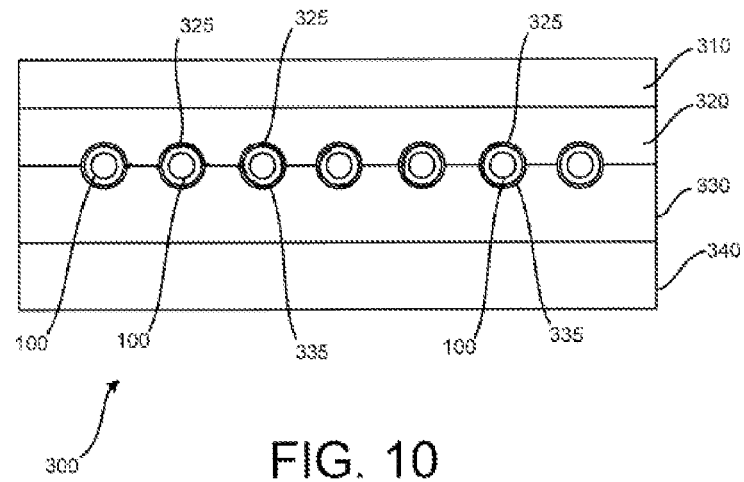
FIG. 10 is a side cross-sectional view of a mattress in accordance with the invention.
Figure 11:
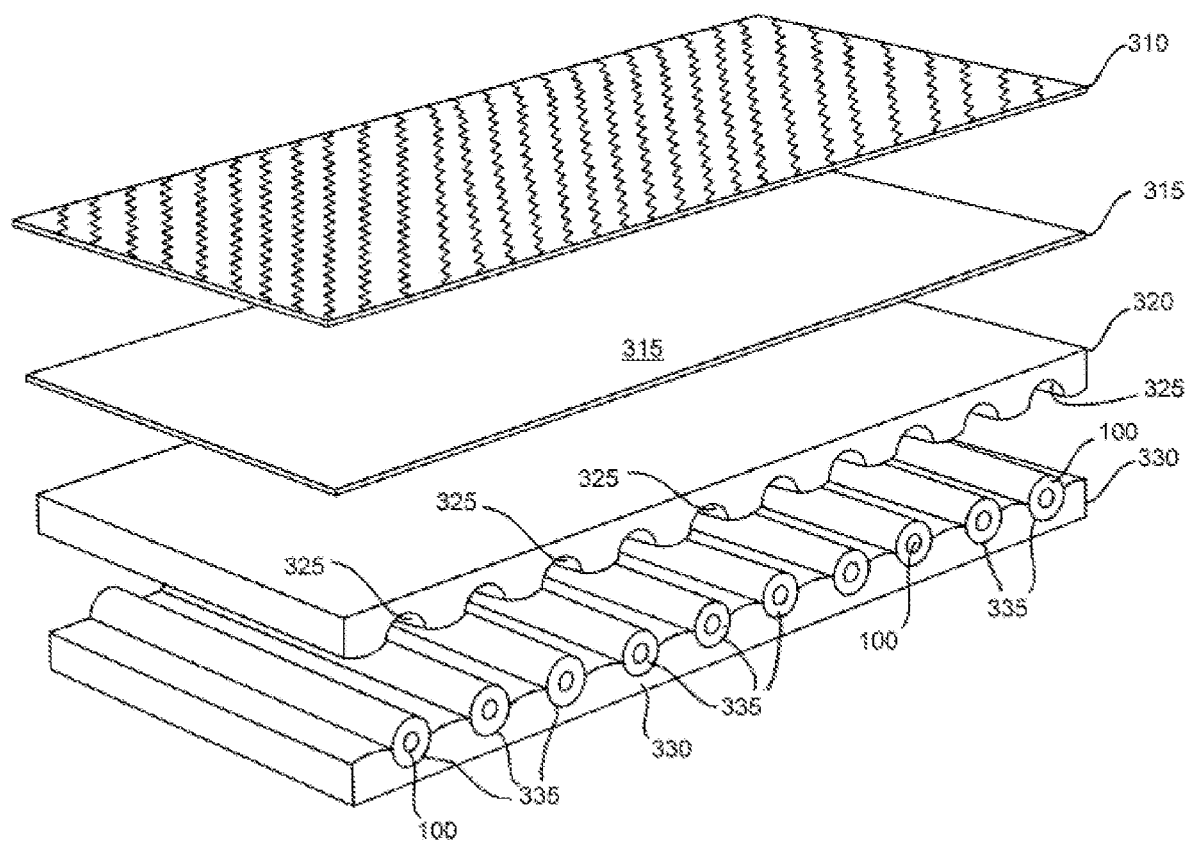
FIG. 11 is a side perspective vertically exploded view of a mattress in accordance with the invention.

In an alternative embodiment of mattress 300, elongated foam springs 100 are positioned extending laterally or longitudinally within the mattress wherein the top sides of the springs 100 are oriented laterally within the mattress, rather than vertically, as illustrated in FIGS. 2, 6 and 9. Examples in accordance with the present invention of mattresses with laterally (widthwise) extending springs are illustrated in FIGS. 10 and 11. In this embodiment, the springs 100 are elongated and positioned on their sides. The springs are mounted within the mattress on mounting structures 320, 330, although any structure can be used that will retain the springs 100 in a desired position within the mattress. In the illustrated embodiments, structures 320 and 330 include a memory foam or a polyurethane foam, and include longitudinally extending receiving slots 325, 335 shaped to receive and retain the springs 100. Optional additional top and bottom layers 310, 315 and 340 are also provided. Layers 310 and 315 are positioned above the retaining structure 320 in this example, and layer 340 is below retaining structure 330. However, it should be understood that any arrangement of layers may be provided.

Figure 12:
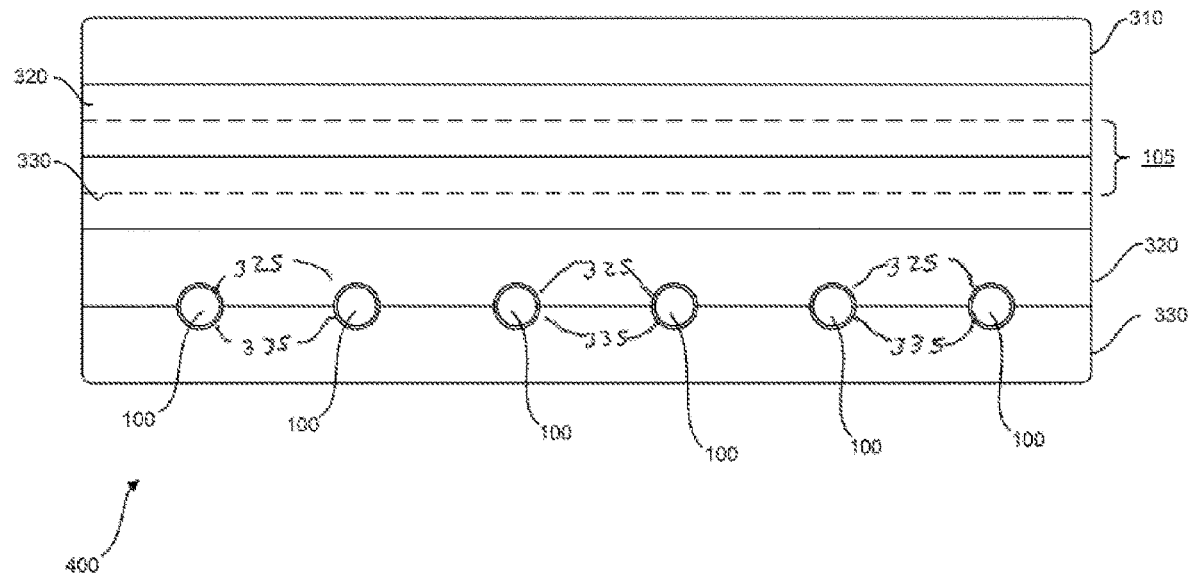
FIG. 12 is a side cross sectional view of a mattress in accordance with the invention.

It should be recognized that any arrangement of the elongated spring 100 of the present invention may be used, such as, for example, arranging the elongated springs longitudinally within the mattress 300, or arranging the elongated springs both longitudinally and laterally within the mattress, as illustrated in FIG. 12. For the sake of clarity, in FIG. 12 the elongated springs 100 are illustrated with reference numbers 100 and 105. In this embodiment as illustrated in FIG. 12, elongated springs 105 are positioned longitudinally within the mattress, seat or cushion 400, and the laterally positioned elongated springs are illustrated with reference numbers 100.

Figure 13:
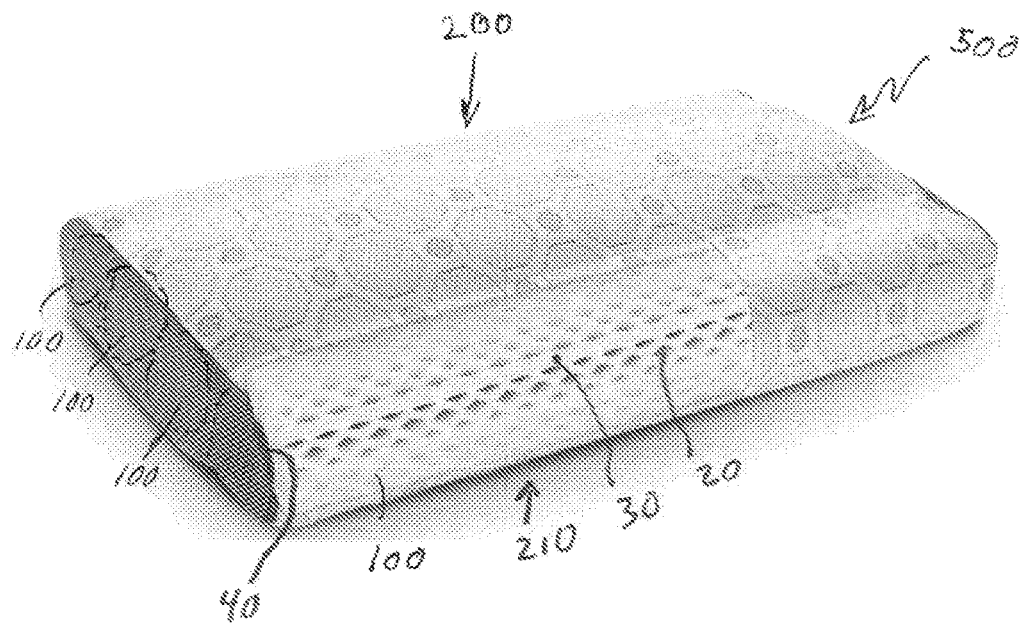
FIG. 13 is a side perspective view with a cutaway section of a pillow in accordance with the present invention.

A pillow 500 embodiment of the invention is illustrated in FIG. 13. In this embodiment the springs 100 of the present invention are positioned within the interior of the pillow 500. Any arrangement of springs 100 may be used that provides a desired firmness and other characteristics of the pillow 500. In one example, springs 100 are positioned laterally within the pillow 500, wherein the compressive forces 200 and 210 act on the long sides of the springs 100. In alternative embodiments, the springs are positioned within a pillow vertically, such as in the arrangement illustrated in FIG. 7 where the compressive forces 200 and 210 act in an axial direction on the springs.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A hollow tubular spring comprising:
   a punctured foam strip attached at opposing ends using an adhesive, forming a hollow tubular shape;
   a plurality of holes extending from an outer surface of the hollow tubular spring towards an inner core; and
   a vertical mid area;
   the hollow tubular spring having a diameter dimension and a height dimension, wherein the diameter dimension and the height dimension is in a relaxed state in response to no external compression force being applied, wherein the diameter dimension in the relaxed state is maintained to be the same throughout an entirety of the hollow tubular spring, wherein the height dimensions in the relaxed state is maintained to be the same throughout the entirety of the hollow tubular spring, and the diameter dimension and the height dimension is in a compressed state in response to an application of the external compressive force and an opposing force opposing the external compressive force applied in an axial direction on a top and a bottom of the hollow tubular spring, wherein the external compressive force and the opposing force compress the hollow tubular spring inward, and wherein in response to the diameter dimension and the height dimension being in the compressed state, the hollow tubular spring bulges radially outward in a center portion of the hollow tubular spring such that lateral buckling of the hollow tubular spring is at or about the vertical mid area of the hollow tubular spring, wherein the hollow tubular spring bulges radially outward in a direction orthogonal to the axial direction, and wherein the lateral buckling avoids lateral slippage.

2. The hollow tubular spring of claim 1, wherein a ratio of the diameter dimension to the height dimension is under 4:3.

3. The hollow tubular spring of claim 1, wherein in response to the diameter dimension and the height dimension no longer being in the compressed state, and wherein no application of the external compressive force and no application of the opposing force being applied, the diameter dimension and the height dimension being in the relaxed state.

4. A mattress, seat, cushion or pillow comprising:
   a plurality of hollow tubular springs, each hollow tubular spring comprising:
      a punctured foam strip attached at opposing ends using an adhesive, forming a hollow tubular shape;
      a plurality of holes extending from an outer surface of each respective hollow tubular spring towards a respective inner core; and
      a vertical mid area;

each hollow tubular spring having a diameter dimension and a height dimension, wherein the diameter dimension and the height dimension is in a relaxed state in response to no external compression force being applied, wherein the diameter dimension in the relaxed state is maintained to be the same throughout an entirety of each hollow tubular spring, wherein the height dimensions in the relaxed state is maintained to be the same throughout the entirety of each hollow tubular spring, and the diameter dimension and the height dimension is in a compressed state in response to an application of the external compressive force and an opposing force opposing the external compressive force applied in an axial direction on a top and a bottom of each hollow tubular spring, wherein the external compressive force and the opposing force compress each hollow tubular spring inward, and wherein in response to the diameter dimension and the height dimension being in the compressed state, each hollow tubular spring bulges radially outward in a center portion of each hollow tubular spring such that lateral buckling of each hollow tubular spring is at or about the vertical mid area of each hollow tubular spring;

wherein each hollow tubular spring bulges radially outward in a direction orthogonal to the axial direction;

wherein the lateral buckling avoids lateral slippage; and wherein the plurality of the hollow tubular springs are arranged within an array in a core area of the mattress, seat, cushion or pillow.

5. The mattress seat, cushion or pillow of claim 4 wherein in response to an application of a downward compressive force over the array, at least two of the plurality of hollow tubular springs arranged within the array bulge radially outwards, and impinge upon one another.

6. The mattress seat, cushion or pillow of claim 5 wherein impingement of adjacent hollow tubular springs upon each other occurs in response to bulging providing additional compression resistance for each spring.

7. The mattress seat, cushion or pillow of claim 5 wherein impingement of adjacent hollow tubular springs upon each other occurs in response to bulging maintaining the springs in a position in relation to each other.

8. The mattress, seat, cushion or pillow of claim 4 wherein in response to an application of the external compressive force over the array, at least two of the plurality of hollow tubular springs arranged within the array bulge radially outwards, and impinge upon one another.

9. The mattress, seat, cushion or pillow of claim 8 wherein impingement of adjacent hollow tubular springs upon each other in response to bulging provides additional compression resistance for each spring.

10. The mattress, seat, cushion or pillow of claim 8 wherein impingement of adjacent hollow tubular springs upon each other when bulging maintains the springs in a position in relation to each other.

11. The mattress, seat, cushion or pillow of claim 4, wherein a ratio of the diameter dimension to the height dimension is under 4:3.

12. A mattress, seat, cushion or pillow comprising:
  a first hollow tubular spring comprising:
    a first plurality of holes extending from an outer surface of the first hollow tubular spring towards a first inner core;
    a first mid area; and
    a first wall having a first width, a first diameter dimension and a first height dimension, wherein the first diameter dimension and the first height dimension is in a first relaxed state in response to no first external compression force being applied, wherein the first diameter dimension in the first relaxed state is maintained to be the same throughout an entirety of the first hollow tubular spring, wherein the first height dimensions in the first relaxed state is maintained to be the same throughout the entirety of the first hollow tubular spring, and the first diameter dimension and the first height dimension is in a first compressed state in response to an application of the first external compressive force and a first opposing force opposing the first external compressive force applied in a first axial direction on a top and a bottom of the first hollow tubular spring, wherein the first external compressive force and the first opposing force compress the first hollow tubular spring inward, and wherein in response to the first diameter dimension and the first height dimension being in the first compressed state, the first hollow tubular spring bulges radially outward in a first center portion of the first hollow tubular spring such that lateral buckling of the first hollow tubular spring is at or about the first mid area of the first hollow tubular spring, wherein the first hollow tubular spring bulges radially outward in a first direction orthogonal to the first axial direction, and wherein the lateral buckling of the first hollow tubular springs avoids first lateral slippage; and
  a second hollow tubular spring comprising:
    a second plurality of holes extending from a second outer surface of the second hollow tubular spring towards a second inner core;
    a second wall separating the second plurality of holes from one another;
    a second mid area; and
    a second wall having a second width, a second diameter dimension and a second height dimension, wherein the second diameter dimension and the second height dimension is in a second relaxed state in response to no second external compression force being applied, wherein the second diameter dimension in the second relaxed state is maintained to be the same throughout an entirety of the second hollow tubular spring, wherein the second height dimensions in the second relaxed state is maintained to be the same throughout the entirety of the second hollow tubular spring, and the second diameter dimension and the second height dimension is in a second compressed state in response to an application of the second external compressive force and a second opposing force opposing the second external compressive force applied in a second axial direction on a top and a bottom of the second hollow tubular spring, wherein the second external compressive force and the second opposing force compress the second hollow tubular spring inward, and wherein in response to the second diameter dimension and the second height dimension being in the second compressed state, the second hollow tubular spring bulges radially outward in a second center portion of the second hollow tubular spring such that lateral buckling of the second hollow tubular spring at or about the second mid area of the second hollow tubular spring, wherein the second hollow tubular spring bulges radially outward in a second direction orthogonal to the second axial direction, and wherein the lateral buckling of the second hollow tubular springs avoids second lateral slippage;
wherein the first hollow tubular spring and the second hollow tubular spring are arranged in a lateral direction on a structure of the mattress, seat, cushion or pillow.

* * * * *